Patented Jan. 5, 1937

2,066,915

UNITED STATES PATENT OFFICE 2,066,915

DIOXAZINE DYESTUFFS AND A PROCESS OF PREPARING THEM

Karl Thiess and Fritz Maennchen, Frankfort-on-the-Main, Germany, assignors to General Aniline Works, Inc., New York, N. Y., a corporation of Delaware No Drawing. Application January 23, 1933, Serial No. 653,173. In Germany January 27, 1932

7 Claims. (Cl. 260—28)

Our present invention relates to new dyestuffs and to a process of preparing them, more particularly it relates to new compounds which probably have the structure of dioxazines and which may be characterized by the probable general formula:

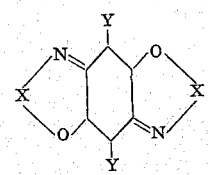

wherein the X's stand for identical radicals of the group consisting of $$\diagdown R-\underset{\underset{\displaystyle R_1}{|}}{N}\diagup\text{acyl}$$

and $$\diagdown R-\overset{\overset{\displaystyle\text{acyl}}{|}}{\underset{\displaystyle R_1}{N}}\diagup$$

the R's and R₁'s being radicals of the benzene or naphthalene series, and the Y's represent hydrogen, halogen or alkyl.

Our new dyestuffs are obtainable by heating benzoquinone compounds of the general formula:

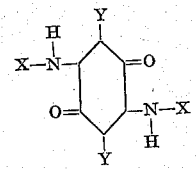

wherein the X's stand for identical radicals of the group consisting of $$-R-\underset{\underset{\displaystyle R_1}{|}}{N}-\text{acyl}$$

and $$-R-\overset{\overset{\displaystyle\text{acyl}}{|}}{\underset{\displaystyle R_1}{N}}-$$

the R's and R₁'s being radicals of the benzene or naphthalene series, and the Y's represent hydrogen, halogen or alkyl, containing in each of the radicals R at least one free ortho-position to the NH-group, either per se or in the presence of high-boiling solvents, preferably, with the addition of a metal chloride or an oxidizing agent or both.

As high-boiling solvents there may be used, for instance, nitrobenzene, trichlorobenzene and the like; as oxidizing agents potassium ferricyanide, pyrolusite, ferric-chloride, alkali metal-nitrites and -nitrates or products of similar action; or nitrobenzene or similar organic nitro compounds may be used simultaneously as solvent or diluent and as oxidizing agent.

The preparation of the above defined acylated benzoquinone compounds used as starting materials may be carried out by introducing the acyl groups in a suitable phase during the production of the compounds which are condensation products of a 1.4-benzoquinone or a substitution product thereof with an amino-diarylamine or an amino-carbanzol compound. The amino-diarylamines and the amino-carbazol compounds are equivalents in the present invention as regards their method of preparation, their properties as well as their capability of reacting.

Any acylating agent is suitable for the preparation of the starting materials above defined. As acylating agents there may be mentioned, for instance, sulfonic and carboxylic acid chlorides and anhydrides of the aliphatic and aromatic series, carbamic acid chloride, carbonyl chloride and agents yielding carbonyl chloride and others.

The new compounds are valuable dyestuffs and are suitable for use as pigment dyes for many purposes. The presence of the acyl groups has the valuable and surprising effect that in some cases the shades of the dyestuffs are considerably shifted to red so that a number of the new dyes show clear violet shades. Instead of using the new dystuffs as such for dyeing purposes they may be converted by sulfonation into water soluble dyestuffs which dye the animal, vegetable and viscose fiber valuable tints. The sulfonation may preferably be carried out by means of fuming sulfuric acid or concentrated sulfuric acid.

Another method of preparing our new dyestuffs consists in heating, preferably at a temperature of about 150° C. to about 300° C., a 1.4-benzoquinone which may contain halogen, alkyl or aryl as substituents with an amino compound of the general formula:

$$H_2N-X$$

wherein X stands for the grouping $$-R-\underset{\underset{\displaystyle R_1}{|}}{N}-\text{acyl}$$

or $$-R-\overset{\overset{\displaystyle\text{acyl}}{|}}{\underset{\displaystyle R_1}{N}}-$$

the R's and the $R_1$'s being radicals of the benzene or naphthalene series, containing in the radicals R at least one unsubstituted ortho-position to the amino group, either alone or in the presence of high-boiling solvents, if advantageous, with the addition of metal chlorides or oxidizing agents or both. When using such 1.4-benzoquinone compounds as condense with the amines with elimination of hydrochloric acid, for instance, chloranil, it is advantageous to use an acid binding agent, such as sodium acetate, which at the same time acts as a condensing agent.

A further modification of the process of preparing the new dyestuffs consists in using as starting materials 1.4-benzoquinone compounds of the general formula:

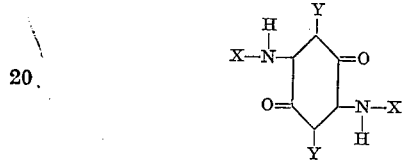

wherein the X's stand for identical radicals of the group consisting of

and

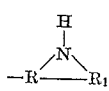

the R's and $R_1$'s having the above meaning, and the Y's represent hydrogen, halogen, alkyl or aryl, containing in each of the radicals R at least one free ortho-position to that NH-group which is linked to the benzoquinone nucleus, and heating these compounds which do not yet contain acyl groups in the presence of acylating agents and otherwise in the manner above defined, or carrying out the heating operation without the addition of an acylating agent and introducing the acyl groups after the formation of the dioxazine compounds.

The dyestuffs obtained according to the several methods described above may likewise be converted by sulfonation into water-soluble dyestuffs.

The following examples serve to illustrate the invention, but they are not intended to limit it thereto, the parts being by weight:

(1) 200 parts of 2.5-di-(N-benzoyl-carbazoyl-3'-amino)-3.6-dichloro-1.4-benzoquinone are heated at boiling temperature for 6 hours in 3000 parts of nitrobenzene. After cooling, the condensation product which has separated is filtered by suction, washed with nitrobenzene and alcohol and dried. It forms a crystalline product showing a greenish metallic luster on its surface and dissolving in concentrated sulfuric acid to a blue solution. The dyestuff may be characterized by the probable formula:

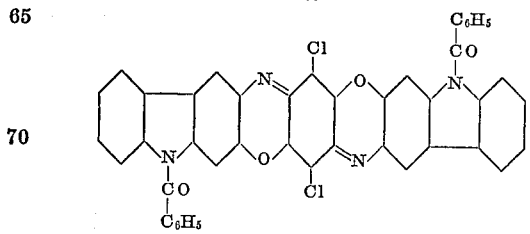

By sulfonating the product with concentrated sulfuric acid or fuming sulfuric acid a water-soluble dyestuff is obtained which dyes cotton beautiful blue-violet tints of good fastness to light.

The 2.5-di-(N-benzoyl-carbazoyl-3'-amino)-3.6-dichloro-1.4-benzoquinone, used as starting material, is a red-brown substance which dissolves in concentrated sulfuric acid to a reddish-blue solution. It is obtainable by condensation of 2.3.5.6-tetrachloro-1.4-benzoquinone with 3-amino-N-benzoyl-carbazol (melting at 142° C.), which is formed by the reduction of the corresponding nitro-compound.

(2) 200 parts of 2.5-di-(N-acetyl-carbazoyl-3'-amino)-3.6-dichloro-1.4-benzoquinone are heated at boiling temperature for 6 hours in 3000 parts of nitrobenzene. After cooling, the condensation product of the probable formula:

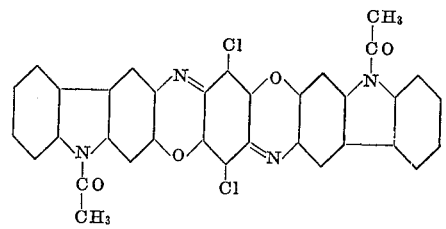

is filtered by suction, washed with nitrobenzene and alcohol and dried. It forms a grayish-green substance which dissolves in concentrated sulfuric acid to a blue solution. By sulfonating the product, a dyestuff is obtained which dyes cotton blue-violet tints of good fastness to light.

The 2.5-di-(N-acetyl-carbazoyl-3'-amino)-3.6-dichloro-1.4-benzoquinone is obtainable by condensation of 2.3.5.6-tetrachloro-1.4-benzoquinone with 3-amino-N-acetyl-carbazol; it is a reddish-brown substance which dissolves in concentrated sulfuric acid to a violet solution. The 3-amino-N-acetyl-carbazol is formed by reduction of the corresponding nitro-compound.

(3) 200 parts of 2.5-di-(N-para-toluene-sulfonyl-carbazoyl-3'-amino)-3.6-dichloro-1.4-benzoquinone are boiled for 6 hours in 3000 parts of nitrobenzene. After cooling, the condensation product which has separated is filtered by suction, washed with nitrobenzene and alcohol and dried. It forms a grayish-green crystalline substance which dissolves in concentrated sulfuric acid to a violet solution, and which probably corresponds to the formula:

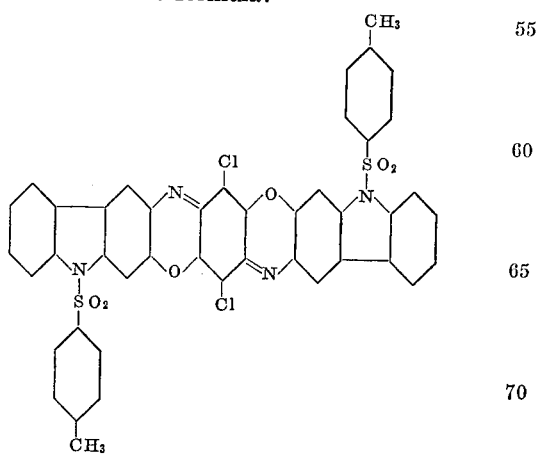

By sulfonating the product, a water-soluble dyestuff is obtained which dyes cotton violet tints of good fastness to light.

The starting material is a brown substance which dissolves in concentrated sulfuric acid to a reddish-blue solution; it is obtainable by condensation of 2.3.5.6-tetrachloro-1.4-benzoquinone with 3-amino-N-para-toluene-sulfonyl-carbazol. This base is formed by reduction of the corresponding nitro-compound which melts at 216° C. and which may be obtained, for instance, by nitration of N-para-toluene-sulfonyl-carbazol.

(4) 200 parts of 2.5-di-(N-diphenyl-carbaminyl-carbazoyl-3'-amino)-3.6-dichloro-1.4-benzoquinone are boiled for 6 hours in 3000 parts of nitrobenzene. After cooling, the separated condensation product of the probable formula:

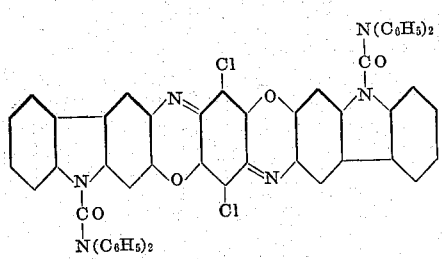

is filtered by suction, washed with nitrobenzene and alcohol and dried. It forms a crystalline powder showing a red luster on its surface and dissolving in concentrated sulfuric acid to a reddish-blue solution. By sulfonating it, a water-soluble dyestuff is obtained which dyes cotton violet tints.

The starting material has a brown color and dissolves in concentrated sulfuric acid to a blue solution; it is obtainable by condensation of 2.3.5.6-tetrachloro-1.4-benzoquinone with 3-amino-N-diphenyl-carbaminyl-carbazol. This base is formed by reduction of the corresponding nitro-compound (melting point at 227° C.), which, for instance, may be obtained by condensation of 3-nitro-carbazol with diphenyl-carbamic acid chloride.

(5) In this example there is used as acydilating agent carbonyl chloride. 3-nitro-carbazol is caused to react with carbonyl chloride, whereby di-(N-3-nitro-carbazol)-carbonyl is formed (melting at 307° C.). By reduction there is obtained the corresponding base which is condensed with 2.3.5.6-tetrachloro-1.4-benzoquinone to form the diarylamino-1.4-benzoquinone representing a brown powder and dissolving in concentrated sulfuric acid to a blue solution. 200 parts of the thus obtained starting material are boiled for 6 hours in 3000 parts of nitrobenzene. After cooling, the condensation product which has separated, is filtered by suction, washed with nitrobenzene and alcohol and dried. It forms a crystalline powder which dissolves in concentrated sulfuric acid to a reddish-blue solution. By sulfonating it, a dyestuff is obtained which dyes cotton violet tints.

(6) 200 parts of 2.5-di-(N-benzoyl-carbazoyl-3'-amino)-3.6-dibromo-1.4-benzoquinone are heated at boiling temperature for 6 hours in 3000 parts of trichlorobenzene with addition of 50 parts of potassium nitrate. After cooling, the condensation product which has separated is filtered by suction and washed with nitrobenzene, alcohol and water. It forms a crystalline product showing a greenish metallic luster on its surface and dissolving in concentrated sulfuric acid to a blue solution. The dyestuff may be characterized by the probable formula:

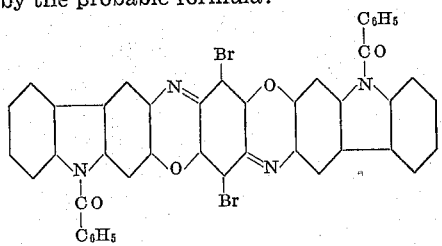

By sulfonating it in concentrated sulfuric acid or in fuming sulfuric acid a water-soluble dyestuff is obtained which dyes cotton clear, violet tints of good fastness to light.

The 2.5-di-(N-benzoyl-carbazoyl-3'-amino)-3.6-dibromo-1.4-benzoquinone used as starting material is obtainable by condensation of 2.3.5.6-tetrabromo-1.4-benzoquinone with 3-amino-N-benzoyl-carbazol.

(7) 200 parts of 2.5-di-(N-benzoyl-4-amino-diphenylamino)-3.6-dichloro-1.4-benzoquinone, obtainable by condensation of 2.3.5.6-tetrachloro-1.4-benzoquinone with N-benzoyl-4-amino-diphenylamine, are boiled for 3 hours in 3000 parts of nitro-benzene. After cooling, the condensation product which has separated is filtered by suction, washed with nitrobenzene and alcohol and dried. The crystalline product dissolves in concentrated sulfuric acid to a blue solution. It has the following probable formula:

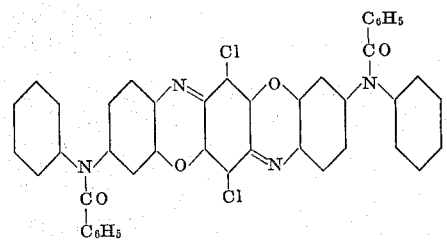

By sulfonating it in concentrated sulfuric acid or fuming sulfuric acid, a sulfonation product is obtained which dyes cotton clear, blue tints of good fastness to light.

(8) 200 parts of 2.5-di-(N-acetyl-carbazol-3'-amino)-6-chloro-1.4-benzoquinone, obtainable by condensation of 2.6-dichloro-1.4-benzoquinone with 3-amino-N-acetyl-carbazol, are boiled for 6 hours with 2000 parts of nitrobenzene. After cooling, the condensation product which has separated is filtered by suction and washed with nitrobenzene and alcohol; it forms metallically glittering crystalline needles which dissolve in concentrated sulfuric acid to a blue solution. The dyestuff may be represented by the probable formula:

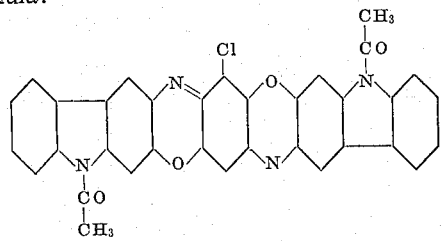

By sulfonating it in concentrated sulfuric acid or in fuming sulfuric acid, a dyestuff is obtained which dyes cotton violet tints.

(9) 200 parts of 2.5-di-(N-para-toluene-sulfonyl-carbazoyl-3'-amino)-6-methyl-1.4-benzoquinone, obtainable by condensation of 2-methyl- 1.4-benzoquinone with 3-amino-N-para-toluene-sulfonyl-carbazol, are boiled for 8 hours with 3000 parts of nitrobenzene and 20 parts of ferric chloride. After cooling, the crystalline condensation product of the probable formula:

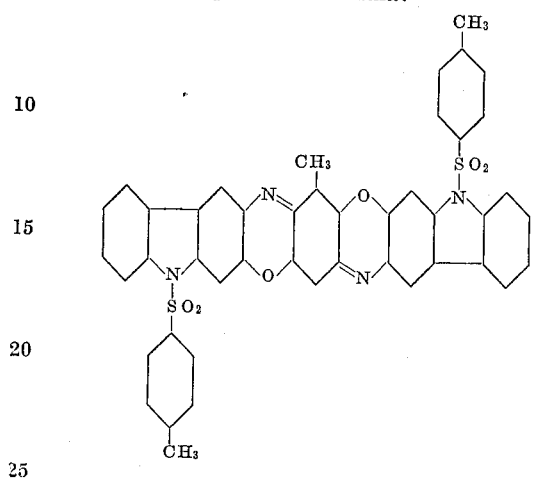

is filtered by suction, washed with nitrobenzene, alcohol and water and dried. It dissolves in concentrated sulfuric acid to a blue solution. By sulfonating it in concentrated sulfuric acid or fuming sulfuric acid, a sulfonic acid is obtained which dyes cotton violet tints.

(10) A mixture of 1000 parts of trichlorobenzene, 57 parts of 3-amino-N-benzoyl-carbazol, 25 parts of 2.3.5.6-tetrachloro-1.4-benzoquinone and 17 parts of anhydrous sodium acetate is heated, after addition of 50 parts of dinitrophenol, to 200° C.–210° C. and heating is continued at this temperature for 6 hours. After cooling, the condensation product which has separated is filtered by suction and washed with nitrobenzene, alcohol and water. The properties of the compound thus obtained are similar to those of the product obtained according to Example 1. The chemical constitution is probably the same as indicated in Example 1.

(11) 10 parts of the condensation product obtainable by boiling 1 mol. of 2.3.5.6-tetrachloro-1.4-benzoquinone and 2 mols. of 3-aminocarbazol in alcohol in the presence of an acid binding agent are boiled for 24 hours in 140 parts of trichlorobenzene with 6 parts of benzo-trichloride and 3 parts of sodium nitrite. At 100° C. the whole is filtered by suction and washed with trichlorobenzene and alcohol. After drying the product which remains on the filter there are obtained 10–11 parts of a dark violet powder which dissolves very difficultly in organic solvents to a violet solution and which dissolves in concentrated sulfuric acid to a greenish-blue solution which rapidly turns green. By sulfonating it, for instance, in sulfuric acid containing 20 per cent of sulfuric anhydride, a water-soluble dyestuff is obtained, which dyes cotton from a bath feebly alkaline with sodium carbonate violet tints.

(12) 10 parts of the condensation product obtainable by boiling 1 mol. of 2.3.5.6-tetrachloro-1.4-benzoquinone and 2 mols. of 3-amino-carbazol in alcohol in the presence of an acid binding agent are boiled for 24 hours in 150 parts of nitrobenzene with 5 parts of para-toluene-sulfonic acid chloride. At 100° C. the whole is filtered by suction and the residue is washed with nitrobenzene and alcohol. After drying, 10–12 parts of a dark violet powder are obtained dissolving in concentrated sulfuric acid to a bluish-gray solution which rapidly turns green. The dyestuff dissolves in traces in chloro-benzene to a violet-red solution showing a beautiful fluorescence. By sulfonating it, a water-soluble dyestuff is obtained which dyes cotton bluish-violet tints.

(13) 10 parts of the condensation product obtainable by boiling 1 mol. of 2.3.5.6-tetrachloro-1.4-benzoquinone and 2 mols. of 3-amino-carbazol in alcohol in the presence of an acid binding agent are boiled for 12 hours in 150 parts of nitrobenzene with 12 parts of benzoyl chloride. The product is worked up and a violet powder is obtained which dissolves very difficultly in organic solvents, for instance, in chlorobenzene or toluene. The solution shows a strong fluorescence. By sulfonating the product, a water-soluble dyestuff is obtained which dyes cotton clear bluish-violet tints. The chemical constitution of the product thus obtained is probably the same as that indicated in Example 1.

(14) 10 parts of the condensation product obtainable by boiling 1 mol. of 2.3.5.6-tetrachloro-1.4-benzoquinone and 2 mols. of 4-amino-4'-methoxy-diphenylamine in alcohol in the presence of an acid binding agent are boiled for 4 hours in 150 parts of nitrobenzene with 12 parts of benzoyl chloride. Since the new dyestuff is dissolved in nitrobenzene, the latter is removed by steam-distillation. The dyestuff forms a dark blue powder which dissolves in concentrated sulfuric acid to a greenish-blue solution. It probably has the structural formula:

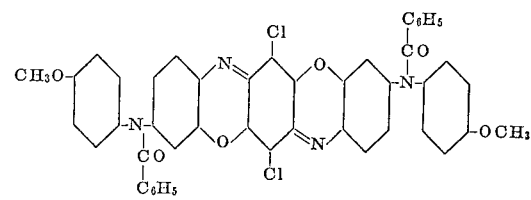

By sulfonating it, a sulfonation product is obtained which dyes cotton blue tints.

(15) By replacing in Example 13 the starting material used therein by the condensation product obtainable by boiling 3 mols. of 1.4-benzoquinone and 2 mols. of 3-amino-carbazol in alcohol, a dyestuff is obtained which is similar to that obtained according to Example 13 and which probably corresponds to the formula:

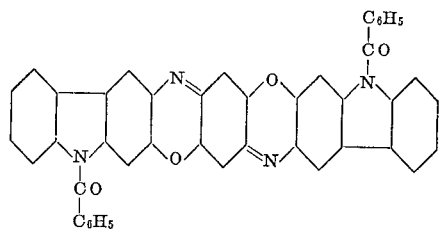

It dissolves in concentrated sulfuric acid to a green solution. By sulfonating it, a water-soluble dyestuff is obtained which dyes cotton blue-violet tints.

(16) By replacing in Example 13 the starting material used therein by the condensation product obtainable by boiling 1 mol. of 2.3.5.6-tetrabromo-1.4-benzoquinone and 2 mols of 3-aminocarbazol in alcohol in the presence of an acid binding agent, a dyestuff is obtained, the properties of which are very similar to those of the dyestuff obtained according to Example 13. The chemical structure of the dyestuff is probably the same as indicated in Example 6.

(17) As starting materials there may be used in the foregoing examples also the products which are obtainable by condensing 1.4-benzoquinone or a halogen-, alkyl- or aryl-substitution product thereof with substituted or unsubstituted amino-N-acyl-phenyl-naphthylamines, amino-N-acyl-di-naphthyl-amines, amino-N-acyl-naphthyl-phenylamines, amino-N-acyl-carbazol compounds other than those already disclosed in the examples, for instance, amino-N-acyl-7.8-benzocarbazol or amino-N-acyl-7.8.7'.8'-dibenzo-carbazol compounds.

Instead of starting from the said condensation products of the 1.4-benzoquinone compound with the said amino-N-acyl compounds it is also possible to use the not yet condensed components, as indicated, for instance, in Example 10. Or, the formation of the dyestuffs may be carried out by using the condensation products of a 1.4-benzoquinone compound with the non-acylated-aminodiarylamine or aminocarbazol compound and working in the presence of an acylating agent, for instance, in an analogous manner to that described in Examples 11 to 16.

We claim:

1. The process which comprises heating a benzoquinone compound of the general formula:

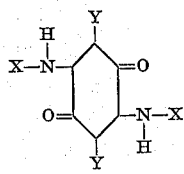

wherein the X's stand for identical carbazole radicals of the formula:

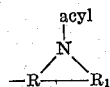

the R's and R₁'s being radicals of the benzene or naphthalene series, and the Y's represent a member of the group consisting of hydrogen, halogen and alkyl, containing in each of the radicals R at least one free ortho-position to the NH-group, in a high boiling inert solvent which may have an oxidizing action.

2. The process which comprises heating a benzoquinone compound of the general formula:

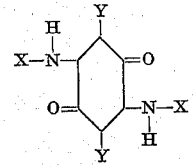

wherein the X's stand for identical carbazole radicals of the formula:

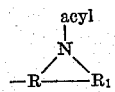

the R's and R₁'s being radicals of the benzene or naphthalene series, and the Y's represent a member of the group consisting of hydrogen, halogen and alkyl, containing in each of the radicals R at least one free ortho-position to the NH-group, in a high boiling inert solvent which may have an oxidizing action and in the presence of an oxidizing agent.

3. The process which comprises boiling in nitrobenzene 2.5-di-(N-benzoyl-carbazoyl-3'-amino)-3.6-dichloro-1.4-benzoquinone of the formula:

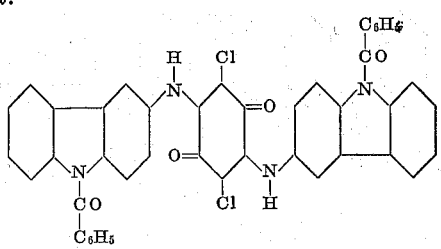

4. The process which comprises boiling in nitrobenzene 2.5-di-(N-acetyl-carbazol-3'-amino)-3.6-dichloro-1.4.-benzoquinone of the formula:

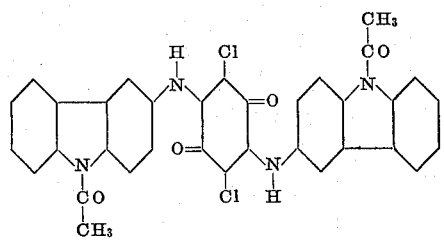

5. The compounds of the general formula:

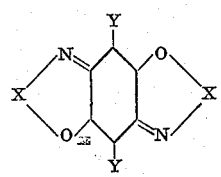

wherein the  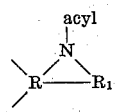

stand for identical carbazole radicals of the formula:

the R's and R₁'s being radicals of the benzene or naphthalene series, and the Y's represent a member of the group consisting of hydrogen, halogen and alkyl, being valuable dyestuffs suitable as pigments and forming, when subjected to a sulfonation process, water-soluble dyestuffs dyeing the animal, vegetable and viscose fiber valuable tints.

6. The compound of the formula:

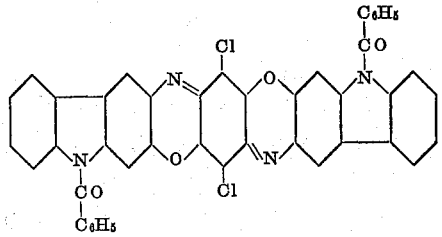

being a crystalline product showing a greenish glittering luster on its surface, dissolving in concentrated sulfuric acid with a blue color and forming, when subjected to a sulfonation process, a water-soluble dyestuff which dyes cotton beautiful blue-violet shades of good fastness to light.

7. The compound of the formula:
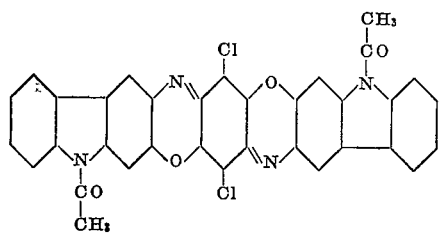
being in the dry state a grayish-green substance, dissolving in concentrated sulfuric acid with a blue color and forming, when subjected to a sulfonation process, a water-soluble dyestuff which dyes cotton blue-violet shades of good fastness to light.
KARL THIESS.
FRITZ MAENNCHEN.